Lancelot A. Fekete
INVENTOR

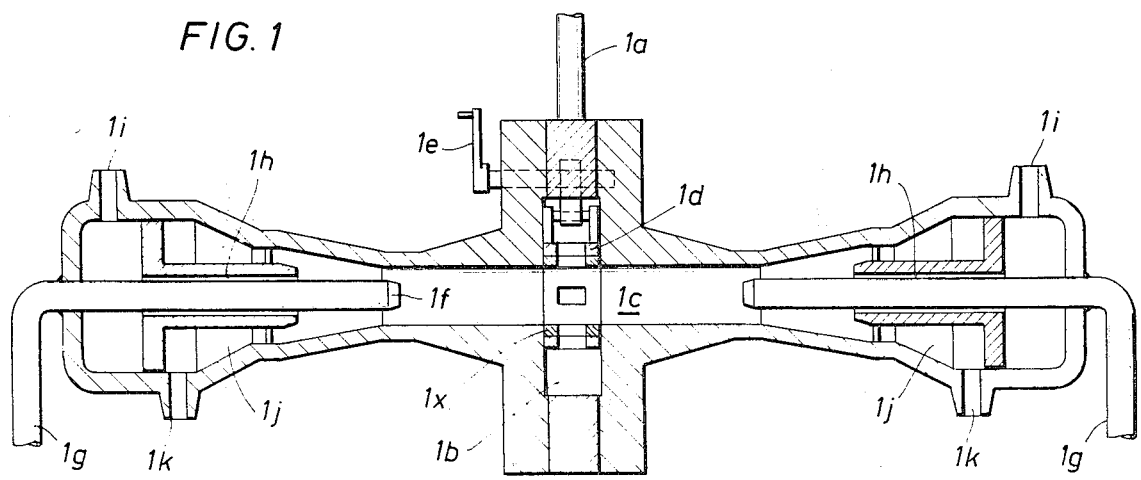
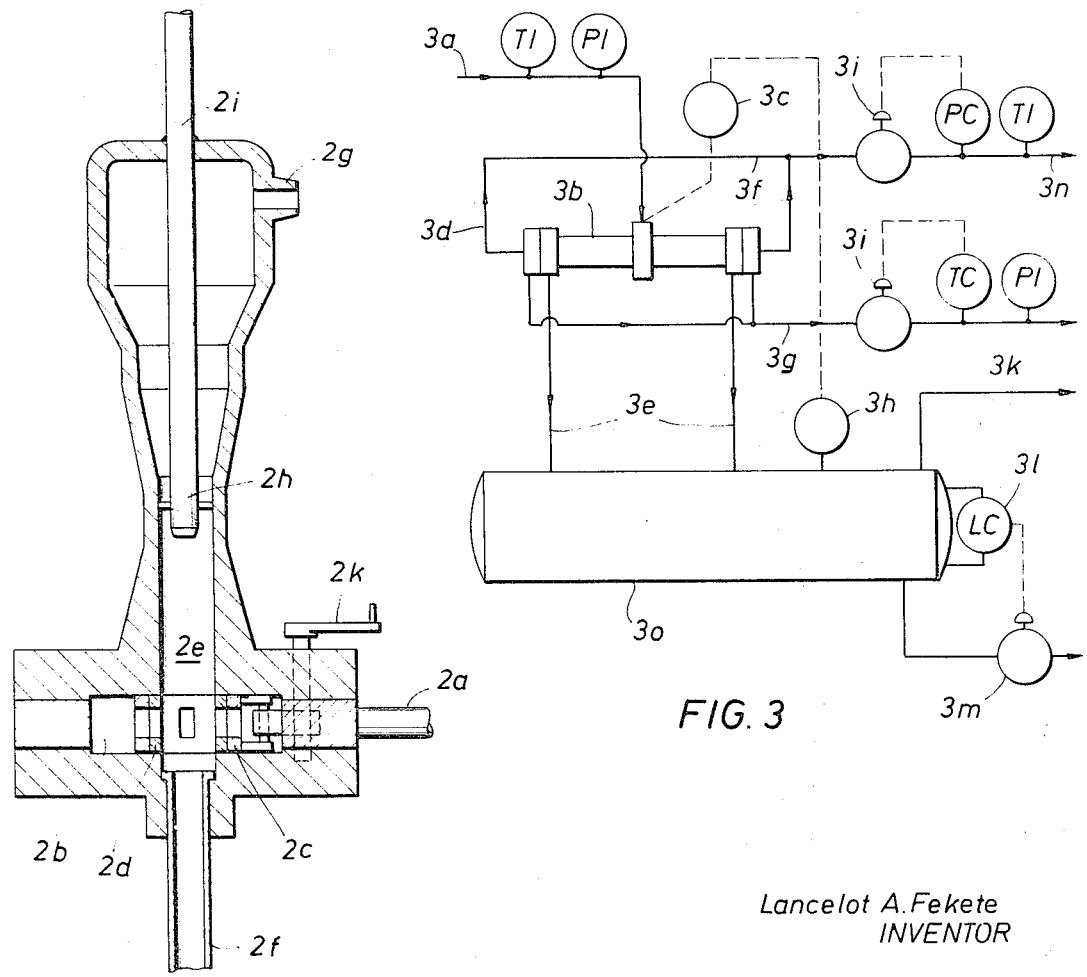
FIG. 1
FIG. 2
FIG. 3
Lancelot A. Fekete
INVENTOR
BY  Bernard A. Reiter
ATTORNEY

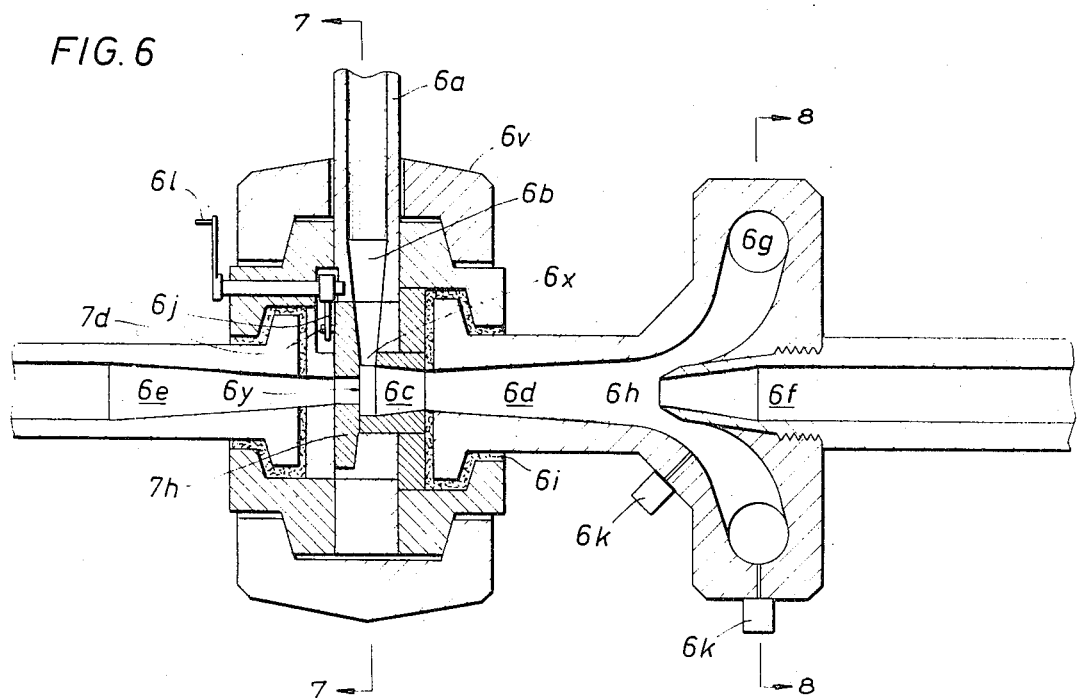

BY Bernard A. Reiter
ATTORNEY

United States Patent Office 3,546,891
Patented Dec. 15, 1970

3,546,891
VORTEX TUBE PROCESS AND APPARATUS
Lancelot A. Fekete, 1632 Colquitt,
Houston, Tex. 77006
Continuation-in-part of application Ser. No. 458,292,
May 24, 1965. This application July 18, 1969, Ser.
No. 855,056
Int. Cl. F25b 9/02
U.S. Cl. 62—5                                22 Claims

ABSTRACT OF THE DISCLOSURE

An improved, multi-stage vortex tube and related process for separating fluid stream components wherein the temperature of one component for example is intermediate the temperature of two other components and wherein the vortex tube includes a housing of generally elongate cylindrical configuration and in which there resides a chamber means having separation means therein for selectively dividing the fluid feed into its respective streams. The vortex tube is further characterized by an inlet opening tangentially communicating with the chamber so as to produce a fast turning vortex upon the introduction of a feed stream thereto. The housing further includes withdrawal means constructed and arranged for removing discretely the respective gaseous and/or liquid streams so as to produce an effective separation of the components in the main feed stream.

THE INVENTION

This application is a continuation in part of my pending application, Ser. No. 458,292, filed May 24, 1965, now abandoned.

This invention relates to the process of separating fluids, such as of refining petroleum hydrocarbons by means of a device called the vortex tube which uses partly the so-called Ranque effect for the separation of gases by molecular weight into a cold and a hot stream and partly a new liquid separation effect by condensing the cold higher molecular weight stream.

The refining of petroleum hydrocarbons at present is carried out in stills or fractionating towers which use the boiling point of the different hydrocarbon components as a basis of separation.

Experiments on hydrocarbon fluids with the controlled flow vortex tube have demonstrated the probability of successful application of the vortex tube in chemical processing. If the temperature of a hydrocarbon mixture is at least 30° to 50° F. higher than the dew point temperature, its physical behavior is similar to that of a gas. When introduced into a vortex tube, a high speed vortex is developed, similarly to a gas, however, with the differ that the components whose boiling point is below the inlet temperature will behave as vapors. The enormous centrifugal force throws them to the periphery of the tube as liquids, and they have to be carried out from a peripheral outlet, while the gas leaves at the central outlet. This phenomenon may be successfully applied in chemical processing, such as petroleum refining. However, as the composition and conditions of the stream vary considerably, the vortex tube can be used with better results if its flow rate can be varied; such controlled flow vortex tube was patented by applicant, see U.S. Pat. No. 3,296,-807 of Jan. 10, 1967.

If a higher than atmospheric pressure gas stream is introduced tangentially into a large diameter pipe where the pressure is lower than half of the initial gas pressure, then the velocity of the incoming gas will be in the range of the velocity of sound and a vortex will develop. In this vortex, a large centrifugal acceleration will be present, of the order of one million times the earth's gravitational acceleration. According to the kinetic gas theory, the average vibration velocity of a gas is proportionate to the square root of the absolute temperature and it is in the range of the sonic velocities. In this strong acceleration field, the average velocity which is proportionate to the temperature of the gas molecules, will increase in the direction of the acceleration. This means that at the walls of the vortex tube the temperature will be higher and in the center it will be lower than the incoming gas temperature. The theoretical maximum temperature at the wall of the tube is twice the incoming gas absolute temperature, the minimum temperature at the center of the tube is absolute zero.

If a mixture of gases and vapors of different molecular weights is introduced into the vortex tube, a separation will take place by molecular weight, in addition to the temperature difference, so that slow higher molecular weight gases will gather in the center of the vortex tube, the fast low molecular weight gases will be separated at the central part of the hot side, while the vapors are condensed to liquids. The vortex tube can be provided with concentric separating tubes which divide the gas stream into hot, cold, and liquid gases.

The present invention refers to new, improved, multi-stage vortex tubes and the new separation process carried out by means of said vortex tubes and associated ancillary equipment.

The new vortex tube and separation process is essentially different from previous vortex tube designs and processes in that previous processes are designed for producing hot and cold from a gas stream. The inventor of the vortex tube, G. Ranque, states in the scientific paper describing his invention: "Humidity of the air has a great importance; the temperature of the cold air stream decreases strongly when the air is humid." Other recent authors do not recommend to use the vortex tube with vapors. The author challenged this statement, and proved with his experiments earlier that vapors can be separated in the vortex tube. However, the value of his discovery was not understood until experiments showed that vapors do not pass through the orifice to the cold side, but remain on the hot side of the vortex tube and may be taken out on a peripheral outlet. At first, a cylindrical enlarged section was used with a tangential outlet to take out the liquid, but as this resulted in producing emulsion, it was changed to a spiral diffusor. As the liquid level varies in the diffusor and liquid may mix with gas, an automatic control was designed to assure that only liquid and all the liquid is taken out. The liquid separated is determined by the pressure and temperature of the gas after the inlet in the cylindrical part of the vortex tube. In a gaseous vortex, the central part is colder, the periphery is warmer than the inlet; also the pressure is lowest at the center and highest at the periphery, so that a positive gradient is experienced. The dew point of a gas also increases with pressure, and experience shows that for medium-range hydrocarbons the temperature gradient of the vortex is about equal to the dew point temperature gradient for a certain molecular weight gas all along the radius of the vortex tube, which means sharp separation by molecular weight, the composition of the liquid fraction being constant along the radius of the vortex tube. In the case that the temperature gradient of the vortex is not equal to the dew point gradient of the desired molecular weight gas, the gradient of the vortex may be adjusted by heating or cooling of the jacket of the vortex tube, or by lowering or increasing the inlet temperature. The temperature difference created by the vortex, that is to say the temperature gradient, is proportional to the absolute temperature of the inlet gas. At the very high speed in the vortex tube, centrifugal forces are present which are in the range of one million times the earth's gravity, and at this strong gravitational field the solubility forces become of less importance, the main acting force being the centrifugal force due to the specific gravity, and the separation is almost quantitative. The new separation principle is the subject of this invention, with the corresponding equipment to put these forces into practical use. The new process was tested with the new vortex tube design, at first on a high pressure gas well, then in a petrochemical plant with a process hydrocarbon mixture of about 36 kg./mol. molecular weight as a depropanizer and a debutanizer with inlet pressure of 550 p.s.i. and inlet temperature of 150° F. and 80° F. respectively and the separation was found satisfactory.

This new invention uses an improved multi-stage vortex tube, similar in principle, operation, and control to the previous improved form, in which the hydrocarbon fluid enters into a spiral-form channel around a tube, and through the openings of the outer moveable and the inner fixed ring it is blown tangentially into the cylindrical chambers. Then a suitable pressure drop produces a nearly sonic velocity and spiral vortex motion. The accelerated gas produces a velocity gradient which means a high temperature difference from the center to the periphery, and also a separation of the "fast" from the "slow" molecules, which separation takes place according to the kinetic energy of vibration of the molecules. The kinetic energy depends on the molecular weight, the ratio of specific heats and the gas constant. This phenomenon may be used advantageously to separate hydrogen in reforming, hydrocracking, alkylation and similar processes, because the hydrogen, due to its low molecular weight and mobility, may be separated from higher molecular weight components in a vortex tube. In petroleum refining, where separation of vapors is the predominant objective, the high centrifugal forces are utilized to separate the condensible vapors on the periphery of the vortex tube. The vortex tube has outlets on both ends, either symmetrical or non-symmetrical. The symmetrical type has concentric outlets, two, three, or more on each end, consisting of concentric conical-cylindrical tubes which start at least two tube diameters from the inlet openings. The non-symmetrical type may have one cold and two hot stream outlets, or two cold and two hot stream outlets, as shown in the accompanying drawings. This permits separation into three or more different fractions using the same vortex tube.

It is to be pointed out that the vortex tube can only separate gases where the molecules can vibrate freely with rather high velocities. It becomes efficient at more than 50° above the bubble point of the upstream fluid. This higher temperature is used also in the common distillation processes, so that the vortex tube is not at a disadvantage in this respect; the necessary operating pressures are about the same. In vacuum, lower temperatures can be used for the same separating range, which is equally true for the vortex tube, however, the final condensation temperature of the vortex tube seems to be somewhat more favorable.

In refining or other chemical processes, the crude oil is first separated from the light products, in the first fractionating column. As the vortex tube cannot operate with liquid feeds, the crude oil has to go either into a primary tower or into a heater, so as to vaporize all but the heavy ends and pass them into the vortex tubes. The light fractions may be separated without preheating, eventually using vacuums on the downstream side of the vortex tube. The heavy fractions need to be heated at least 50° F. above their boiling point to be treated in vortex tubes. The middle boiling products are sent into successive vortex tubes, where the liquid stream goes into a receiver; the gaseous products are joined and passed through a heat exchanger into a subsequent vortex tube.

The piping, vessels, and other equipment will be less than half of the normal refinery or process equipment, and the separation is expected to be more perfect and more efficient. Whenever the quality of feed is such, vacuum process can be used and pressures can be kept lower. Another way to keep pressures low is to use compressors between stages.

The controls are simple, it is either the composition or the temperature of the downstream liquid that is usually maintained constant with a control device on the liquid line, which regulates the inlet gas temperature at constant pressure.

The vortex tube can be useful also in the extractive distillation processes, where it may operate on narrow boiling range feeds to separate the paraffinic hydrocarbons from the naphtenic with intermediate boiling range solvents. These and numerous other features and advantages of the invention will become more apparent upon a careful reading of the following detailed description, claims and drawings:

BRIEF DESCRIPTION OF THE DRAWINGS

FIG. 1 is a schematic cross sectional view of the new type three-stream symmetrical vortex tube.

FIG. 2 is a schematic cross sectional view of the new three (or four) stream asymmetrical type vortex tube.

FIG. 3 is a flow diagram showing a possible method of control of the three-stream symmetrical vortex tube.

FIG. 4 is a generalized flow diagram of a multistage vortex tube gas separating process.

FIG. 5 is the generalized flow diagram of a sidestream gas separation process to split a sidestream into a liquid and two gaseous streams.

FIG. 6 is a schematic drawing of a new three outlet vortex tube.

Figure 7:
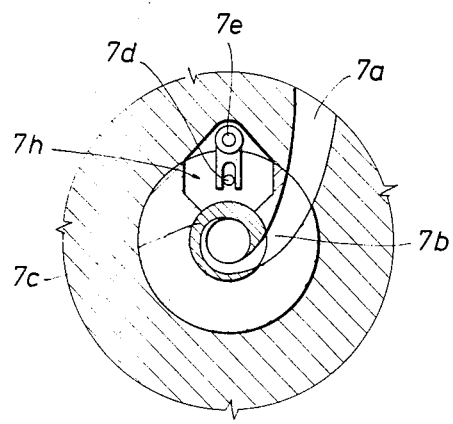
FIG. 7 is a cross section view along the plane 7—7 of FIG. 6.

At FIG. 1, the fluid mixture enters at $1a$ into the spiral channel $1b$ of the vortex tube. Through the openings of a moveable $1d$ outer ring and a fixed inner ring $1x$ the gas enters into the cylindrical chamber $1c$ of the vortex tube tangentially, so that a fast turning vortex is formed. The flow rate can be controlled by turning the outer ring $1d$ by means of the lever $1e$, so that the outer ring will restrict the openings of the fixed inner ring. The cross section through the entrance may be similar to that shown on FIG. 7. On the outside of the cylindrical vortex chamber $1c$ nearly sonic velocity will develop, which will cause molecular separation of the gas, and a heating and cooling effect. The cold inner part of higher molecular weight will be introduced into the central tube $1f$ and out the opening $1g$. The intermediate gaseous product will be separated in the annular passage $1h$ and carried out through openings $1i$, and the liquefied vapors will be collected at the peripheral ring $1j$ and eliminated through openings $1k$.

FIG. 2 is a similar type vortex tube to FIG. 1, however this is asymmetrical, so that it serves a different purpose. Its main use will be in cases where a substantially liquid component is to be separated from two or more lighter ones. The gas mixture enters in pipe $2a$ into the annular opening $2b$ and from here through the openings of the moveable ring $2c$ which may be operated by the lever $2k$ and the fixed inner ring $2d$ into the cylindrical vortex chamber $2e$. The cross section through the entrance may be similar to that shown on FIG. 7. The central part of the vortex will separate the heavy components in the cold stream, and these will be drained through the central orifice and tube $2f$ downwards. The components, the dew point of which is higher than the temperature at the entrance inside the vortex tube, being heavier than the gas molecules are thrown to the periphery of the tube immediately as liquids and are carried out through the outlet 2g. The hot and light parts will follow upwards, the light products will remain in the central tube 2h and will be exhausted through 2i.

FIG. 3 shows one possible method of control of the vortex tube. The gas or vapor mixture arrives through pipe 3a into the vortex tube 3b. The flow rate of the entering gas stream is controlled by the servomotor 3c from the temperature controller 3h, so that a constant liquid temperature is maintained by varying the entering flow rate to assure constant vapor pressure. The entering gas mixture is separated in a cold fraction 3d, liquid fraction 3e and a hot fraction 3g. The quantity of the hot fraction is determined by the pressure controller 3i, while the liquid fraction has only a level control 31. The cold stream 3d is discharged through pipe 3f. The liquid fraction is drawn off through the control valve 3m operated by the level control 31. The cold gas is sent through pipe 3n to the pipeline or to other uses.

FIG. 4 shows a generalized diagram of a fluid separation process for separating light gases from heavy gases in countercurrent separation with more vortex tubes in series. This is to be used in such processes where the separation concerns purely gases, with no condensibles involved, such as hydrogen, helium, nitroeng or carbondioxide. This process is similar to the countercurrent principle applied generally in chemical processing. The gas mixture enters at 4a—together with the hot gas stream 4f of the second vortex tube—into the first vortex tube 4b where it is separated into cold (heavier) 4d and hot (lighter) 4c gas streams. The light (hot) 4c gas stream of the first vortex tube is the final light gas product. The heavier (cold) 4d gas stream is passed—preheated in the heat exchanger 4e—into a second vortex tube 4q, where it is again separated into light (hot) 4h and heavy (cold) 4i streams. The light (hot) stream 4h of this second vortex tube is returned through the exchanger 4e and injector or compressor 4x—to increase its pressure to the entrance pressure of the first vortex tube 4b—into the first vortex tube 4b to separate the remained light components. The heavy (cold) stream 4i is passed—through heat exchanger 4k—into the third vortex tube 4l, where the gas mixture is again separated into a light (hot) 4m and a heavy (cold) 4n stream. The light (hot) 4m gas is returned through the heat exchanger 4k and injector or compressor 4j into the second vortex tube 4g, and the heavy (cold) stream 4n in the separated heavy end product cleaned in three stages from the light component. This flow-sheet may be altered so that the lighter (hot) components are separated through more stages, or both components may go through more vortex tube stages.

The same process of FIG. 4 may be used also to separate condensed liquids in more stages in such cases where the separation efficiency of a one stage vortex tube is not satisfactory. The vortex tubes may be a three or other multiple outlet tubes in series.

FIG. 5 shows the generalized diagram of a possible use of the vortex tube as an auxiliary process for separating a sidestream component of a fractionating tower. It may be used to improve the separation efficiency of existing processes or to separate some additional stream from a process. The sidestream of a tower 5a—or any other stream of a process—is taken out through a heat exchanger 5b and a compressor 5k into the vortex tube 5c. The liquid component is separated at the periphery of the hot side of the vortex tube at 5g and passed through heat exchanger 5b into the liquid separating drum 5m. The heavier (cold) gas components pass through the diaphragm and are taken out at 5i. The light (hot) gaseous products are taken out at the center or the hot side 5e, the ratio of hot and cold gas stream being controlled by the control valve 5l.

Figure 8:
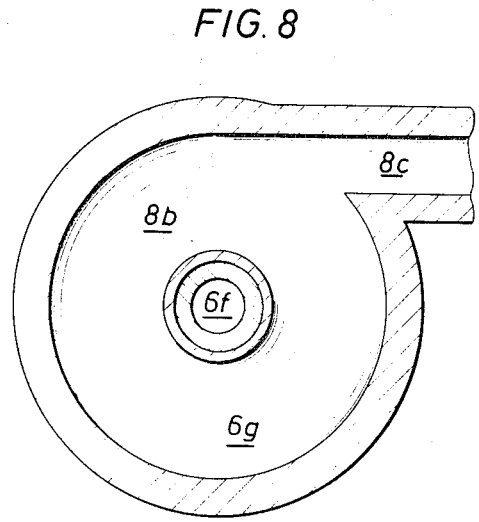
FIG. 8 is a cross section view along the plane 8—8 of FIG. 6.

FIG. 6 is the schematic cross sectional view of the vortex tube designed for use in the separation process. The fluid mixture enters at 6a through a curved channel of gradually decreasing cross sectional area 6b through a variable area orifice 6x into the cylindrical entrance of the vortex. The cross section of this part of the vortex tube is shown on FIG. 7. The entrance channel 7a is gradually diverted from the straight line into the circular part 7b of the tube so as to achieve a path of gradually decreasing radius and gradually increasing centrifugal acceleration. The cross sectional area of the entrance may be decreased by turning the ring-shaped entrance section 7c which has a flat disc 7h shaped side provided with a pin 7d by operating the lever 7e. This lever can be controlled from the outside of the vortex tube through a lever 61, on which lever any kind of mechanical control may be supplied, such as a diaphragm valve operator, an electric motor operator or similar. By turning lever 7e, the inside ring-shaped tube entrance 7c turns inside the channel section 7b so that the entrance opening cross sectional area can be restricted or even closed completely. The gas inside the vortex tube is separated through a restriction which may be a diaphragm or a nozzle 6y, into a heavier gaseous cold stream 6e which passes through the restriction, and a hot stream which consists of light gases and a liquid which is immediately thrown out to the periphery of the hot side, so that it cannot pass through the restriction. The hot side of the vortex tube has a special double cone Venturi-tube shape, the narrow ends of the cones being of the same area, about 80% to 90% of the entrance cross sectional area. The purpose of the restriction 6c is to stabilize the supersonic vortex flow and to help part of the stream to pass to the cold side through the orifice. The increase in diameter 6d serves the purpose to accelerate the tangential velocity and to decrease the axial velocity, thus increasing the separation efficiency. The end of the hot side of the tube is a doughnut shaped diffusor 6g which helps to decelerate the flow with possibly small pressure loss and to collect the liquid without emulsion formation. The central part of the hot gas stream is taken out at 6h through a conical shaped tube at 6f. The cross section of the diffusor is shown on FIG. 8. The double-cone Venturi is shown as 8a and the liquid expands into the doughnut shaped area 8b, and carried out through a tangential tube 8c. The different outlets of the vortex tube are of different temperature. A heat insulation 6i is used to separate the cold and the hot side outlets so as to prevent heat flow between the parts and to achieve good heat efficiencies. The diffusor has one or two pressure 6k taps which are actuated by the liquid level in the diffusor on a pressure operated control device to assure that only liquid and all the liquid is taken out from the peripheral outlet.

Figure 9:
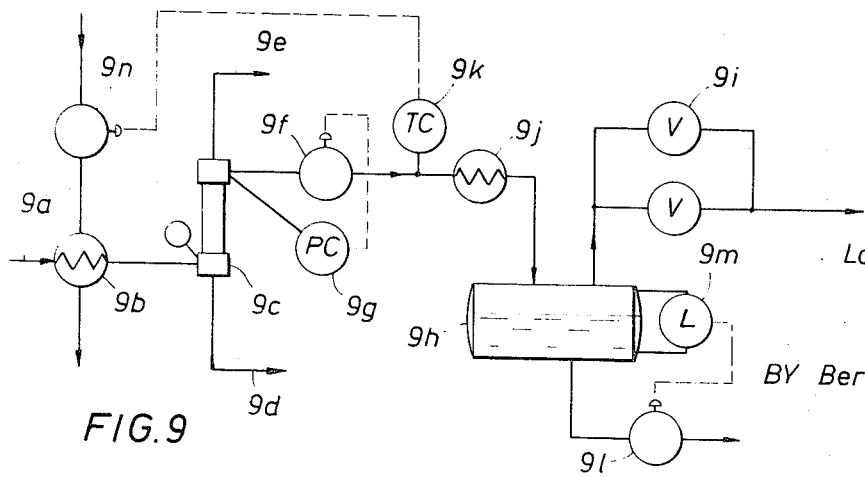
FIG. 9 is a schematic flow diagram of the new vortex tube liquid separation process.

FIG. 9 is a schematic flow diagram of the fluid separator vortex tube process. The gas stream passes through heat exchanger 9a where its temperature and pressure are regulated to produce the proper separation boiling point conditions inside the vortex tube. The temperature is regulated by the flow control valve 9n so that the proper flow rate of heating or cooling fluid is passed through heat exchanger 9a. The flow rate of the entering gas stream in the vortex tube may be controlled by the flow controller 9b, to fit the process conditions. The higher molecular weight gas leaves the vortex tube at the cold outlet 9d. The liquefied vapors are taken out through the diffusor side outlet and through control valve 9f, actuated from the pressure taps and pressure controller 9g of the diffusor to assure that all the liquid and only the liquid is taken out. The light hot gases leave at the central hot outlet 9e of the diffusor. The liquid after passing cooler 9j may be collected in drum 9h where it is separated from the eventual gas. Level control 9m assures a constant liquid level in the drum.

Figure 10:
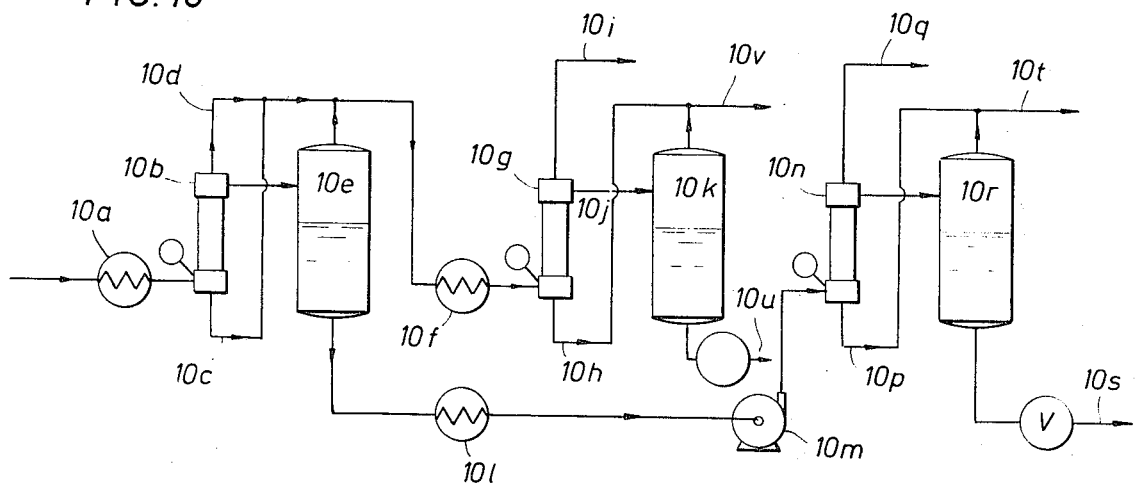
FIG. 10 is a schematic flow diagram of a vortex tube multi-stage separation process with liquid separation.

FIG. 10 is a generalized schematic flow diagram of a vortex tube process for hydrocarbons or other chemical processes. Part of the crude oil or other stream is changed into fluid form above its dew point for instance by heating it in the heat exchanger 10a and passed into the first vortex tube 10b. Here the fluid stream is separated into two cuts, a high molecular weight liquid cut 10e and a low molecular weight gaseous cut 10c and 10d which may be treated together. The gas phase is passed through exchanger 10f the purpose of which is to control the separation temperature inside the vortex tube 10g. The liquid which is taken out at the periphery of the hot side 10j is passed into the collector drum 10k. The light hot gas leaves at 10i and the heavy cold gasses at 10h. Both streams may be separately sent into subsequent vortex tubes for further separation. The separated liquid cut from drum 10e (or eventually from other drums, like 10k) is passed through furnace 10p to increase its temperature and through blower 10m to increase its pressure into vortex tube 10n. Here the light gas leaves at the central hot outlet 10q, the heavy gas at the cold outlet 10p and the liquid at the peripheral hot outlet into drum 10r. The control of each one of the vortex tubes may be similar as shown on FIG. 9.

The application of these processes is not restricted to their use in hydrocarbon processing but also may be applied to other chemical processes. That which is claimed is:

1. A vortex tube for the separation of a fluid feed into a first stream, a second stream and a third stream, the temperature of which is intermediate that of the first and second stream comprising:
   a housing of generally cylindrical configuration formed about an elongated central axis and having a chamber means therein, said chamber means including separation means therein for selectively dividing said gaseous feed into the first, second, and third streams;
   an inlet opening disposed in said housing and in tangential communication with said feed chamber so that upon the introduction of the feed stream therein, a fast turning vortex is produced about the elongate central axis; and
   withdrawal means for discretely removing each of said first, second and third streams as respective fractions of the gaseous feed so that an effective separation thereof is accomplished.

2. The vortex tube of claim 1 wherein said separation means in said chamber means consists of an annulus of gradually increasing size.

3. A vortex tube of claim 1 in which at least one of the withdrawal means is tangentially oriented with respect to the housing in order to transform the kinetic energy of the circular motion into potential pressure energy.

4. A vortex tube in accordance with claim 1 wherein means are operatively associated with said inlet opening to vary the flow therethrough.

5. A vortex tube in accordance with claim 4 wherein the housing is characterized by an enlarged collection means for receiving and collecting liquid therein and having one of said withdrawal means communicating with said collection means for removing liquid therefrom, thereby effectively separating condensed vapor.

6. A vortex tube in accordance with claim 5 wherein feed line means are operatively connected to said inlet opening, said feed line means including a stationary spiral channel which gradually transforms the linear motion of the inlet into a circular motion of gradually increasing velocity.

7. A vortex tube in accordance with claim 6 in which said stationary spiral channel has an inside movable ring with a tangential slit which allows to decrease the width of the opening so as to decrease the flow rate of the gas into the tube gradually.

8. A vortex tube suitable for the separation of a gaseous feed into a hot stream, a cold stream, and a stream of intermediate temperature comprising:
   a housing of generally cylindrical configuration formed about an elongate central axis;
   an inlet opening near a first end of said tube disposed tangentially to said cylindrical housing;
   a chamber means defined within said housing and in operative communication with said inlet opening so that introduction of a feed through said opening produces a fast turning vortex which is characterized by a cold fraction being formed about the central axis of said chamber, a hot fraction being formed about the periphery of said chamber, and a fraction of intermediate temperature being formed in an annulus between said hot and cold fractions; and
   withdrawal means operatively connected to said housing for discretely and individually removing each said fractions at different parts of said housing, the means for withdrawing said fraction of intermediate temperature consisting of tubes which have gradually increasing cross section.

9. A vortex tube in accordance with claim 8 wherein the housing is characterized by an enlarged collection means for receiving and collecting liquid therein and having one of said withdrawal means communicating with said collection means for removing liquid therefrom, thereby effectively separting condensed vapor.

10. A vortex tube in accordance with claim 9 wherein said inlet comprise a movable outer ring and a fixed inner ring, said outer ring being operable by means on the exterior of said housing.

11. The vortex tube of claim 1 in which said inlet opening is characterized by a Venturi-shaped body having a first and second conical sections interconnected by a conduit means, the inlet opening communicating with said first conical section, the length of said first conical section being about equal to its diameter at the inlet so as to stabilize the fluid flow from the inlet into a relatively coherent vortex and to force part of the fluid towards the opposite end of the tube, said second conical section having a length of substantially more than the diameter of the first conical section at the inlet so as to produce higher tangential velocities while maintaining comparatively lower axial velocities, thereby increasing the thermal efficiency of the device.

12. The vortex tube of claim 1 wherein there is provided an insulating means between parts of the vortex tube so as to reduce the passage of heat therebetween.

13. A process for the separation of a gaseous feed to obtain an end product of high purity which comprises:
   introducing a fluid feed into first a vortex tube;
   separating said feed in said first tube into a liquid steam, a hot steam, and a cold steam;
   withdrawing said liquid steam from said tube and heating it, and thence utilizing said steam as the inlet feed in a second vortex tube;
   separating said feed in said second vortex tube into a second liquid steam, a second hot steam, and a second cold steam;
   withdrawing said second liquid steam and utilizing said steam as the inlet feed in a third vortex tube so as to obtain the high purity steam; and
   thence passing the other gas steams in combination into another vortex tube after raising their pressure to the inlet pressure of said vortex tube.

14. A process for the refining of liquid hydrocarbons which comprise:
   providing a hydrocarbon feed steam and heating said feed steam to a temperature above the bubble point of the highest boiling product to be separated, thereby forming a vapor having a lower boiling point than the inlet temperature;
   withdrawing said fluid and introducing it into a vortex tube;
   separating said fluid in said vortex tube into a liquid steam, a cold steam, and a gas steam of intermediate temperature and withdrawing said cold, hot, and intermediate streams from said vortex tube to thereby provide refined steams having different dew points.

15. A process in accordance with claim 14 wherein said hot stream is introduced into a second vortex tube, whereupon it is separated into liquid, cold, and or intermediate gaseous components, and or said components are withdrawn to provide further separation of fractions having different dew points.

16. A process in accordance with claim 15 wherein said stream of intermediate temperature is introduced into a second vortex tube, whereupon it is separated into liquid, cold gas and or intermediate gaseous components, and said components are withdrawn to provide further separation of fractions having different dew points.

17. A process in accordance with claim 16 wherein said liquid stream of the first vortex tube is withdrawn and passed into a separator whereupon it is separated into liquid and gaseous streams, and the gaseous stream from said separator is thence combined with said stream of intermediate temperature for passing into said second vortex tube.

18. A process in accordance with claim 17 wherein said liquid stream after being heated above its dew bubble point is introduced into another vortex tube in which said stream is separated into liquid, cold, and hot gas components and said components are withdrawn to provide further separation of fractions having different dew points.

19. A process in accordance with claim 16 wherein the gaseous feed is such that no condensation can occur inside the vortex tube, and the gases are separated in subsequent vortex tubes into a higher and a lower molecular weight part, the cut being determined by the inlet pressures and temperatures of each controlled flow vortex tube.

20. A process in accordance with claim 16 in which the downstream pressure is below atmospheric so as to allow separation of gases and liquids at relatively low temperatures.

21. The vortex tube separation process of claim 16 in which the temperature gradient inside the vortex tube is changed by heating or cooling the jacket of said tube so as to obtain a temperature gradient which is most favorable for the separation conditions.

22. The vortex tube of claim 1 wherein a diffusor means is operatively associated therewith,
fluid outlet means communicating with said diffusor means, and
a pressure sensing means connected to said outlet means and to control valve means so that selective removal of liquid is accomplished from the diffusor means without the removal of gas therefrom.

References Cited
UNITED STATES PATENTS

| | | | |
|---|---|---|---|
| 2,907,174 | 10/1959 | Hendal | 62—5 |
| 3,116,344 | 12/1963 | Seisler | 62—5 |
| 3,129,075 | 4/1964 | Anliot | 55—17 |
| 3,296,807 | 1/1967 | Feketi | 62—5 |

WILLIAM J. WYE, Primary Examiner

U.S. Cl. X.R.

55—17